United States Patent
Kudoh (10) Patent No.: US 8,228,415 B2
(45) Date of Patent: Jul. 24, 2012

(54) LENS BARREL AND IMAGE PICKUP APPARATUS

(75) Inventor: Tomoyuki Kudoh, Tokyo (JP)

(73) Assignee: Canon Kabushiki Kaisha (JP)

(*) Notice: Subject to any disclaimer, the term of this patent is extended or adjusted under 35 U.S.C. 154(b) by 266 days.

(21) Appl. No.: 12/034,392

(22) Filed: Feb. 20, 2008

(65) Prior Publication Data

US 2008/0198260 A1    Aug. 21, 2008

(30) Foreign Application Priority Data

Feb. 21, 2007 (JP) ................. 2007-040907

(51) Int. Cl.
*G02B 13/16* (2006.01)
*H04N 5/225* (2006.01)
(52) U.S. Cl. ..................................... 348/335
(58) Field of Classification Search ............ 348/335
See application file for complete search history.

(56) References Cited

U.S. PATENT DOCUMENTS

| | | | | |
|---|---|---|---|---|
| 5,293,542 A * | 3/1994 | Ise et al. | ......... | 348/363 |
| 7,433,099 B2 * | 10/2008 | Kondo | ......... | 358/516 |
| 2001/0040626 A1 * | 11/2001 | Ohta et al. | ......... | 348/220 |
| 2004/0135916 A1 * | 7/2004 | Makii | ......... | 348/335 |

FOREIGN PATENT DOCUMENTS

| | | |
|---|---|---|
| JP | 2003-021858 A | 1/2003 |
| JP | 2004-151131 A | 5/2004 |
| JP | 2004-347615 A | 12/2004 |
| JP | 2004347615 A * | 12/2004 |
| JP | 2006-171242 A | 6/2006 |

OTHER PUBLICATIONS

JP Office Action issued May 8, 2012 for corresponding JP2007-040907.

* cited by examiner

*Primary Examiner* — Anthony J Daniels
(74) *Attorney, Agent, or Firm* — Rossi, Kimms & McDowell LLP

(57) ABSTRACT

A lens barrel capable of, in a housed state of the photographing lens barrel, making an image pickup apparatus more compact than the conventional image pickup apparatuses, while protecting an image pickup element from harmful light. The lens barrel comprises a lens holding section adapted to hold a lens, a dimming filter adapted to be retractable to reduce light from an object, a shutter adapted to be opened and closed to shield the light from the object, and a control unit adapted to control the movement of the lens holding section, the dimming filter and the shutter. The control unit is adapted, in a non-image-pickup state, to close the shutter and to retreat the dimming filter, and adapted to move the lens or the lens holding section to a space formed by retreating of the dimming filter.

5 Claims, 13 Drawing Sheets

LENS BARREL AND IMAGE PICKUP APPARATUS

BACKGROUND OF THE INVENTION

1. Field of the Invention

The present invention relates to a lens barrel and an image pickup apparatus, and more particularly, to a lens barrel and an image pickup apparatus disposed in a film camera, a digital camera, and the like.

2. Description of the Related Art

Conventionally, a film camera using silver halide film has been prevalent. Further, a digital camera capable of capturing image data into a memory without using a film has become popular rapidly in recent years. Any of the film camera and the digital camera generally includes a shutter and a diaphragm necessary for adjusting light quantity at the time of photographing. It is normally desirable that around the blades of the shutter and the diaphragm, other members are arranged with a fixed clearance so as not to be in contact with the blades of the shutter and the diaphragm. Further, in recent years, the cameras have been desired to be further miniaturized or reduced in thickness in order to improve the portability thereof. Thus, there occurs a situation where the other members are inevitably arranged even in the vicinity of the shutter and the diaphragm.

Further, in the camera described in Japanese Laid-Open Patent Publication (Kokai) No. 2004-347615, when photographing is not performed, the shutter and the diaphragm are retreated from a photographing optical axis, so that a lens and a part of a lens holder on the periphery of the lens are inserted in the opening formed by retreating the shutter and the diaphragm. This is to reduce the thickness of the photographing lens barrel.

However, in the above described cameras, the lens and the part of the lens holder on the periphery of the lens are inserted into the opening obtained by retreating the shutter and the diaphragm, and hence harmful light may be irradiated to an image pickup device. In particular, the period in which the camera is set in a non-image-pickup state is often overwhelmingly longer than the period in which the camera is set in a photographing state. In the long non-image-pickup state, the image pickup device may often be continuously irradiated with harmful light for a long period of time, which may cause destruction or performance deterioration of the image pickup device.

SUMMARY OF THE INVENTION

The present invention provides a lens barrel which can be made more compact than the conventional image pickup apparatuses in a housed state of the lens barrel, while protecting an image pickup element from harmful light, and provides the image pickup apparatus having the lens barrel.

According to a first aspect of the present invention, there is provided a lens barrel comprising a lens holding section adapted to hold a lens, a dimming filter adapted to be retractable to reduce light from an object, a shutter adapted to be opened and closed to shield the light from the object, and a control unit adapted to control the movement of the lens holding section, the dimming filter and the shutter, wherein the control unit is adapted, in a non-image-pickup state, to close the shutter and to retreat the dimming filter, and adapted to move the lens or the lens holding section to a space formed by retreating of the dimming filter.

The lens barrel further can comprise a regulation unit adapted to regulate the dimming filter to be held in the retreated state when the dimming filter is retreated.

According to a second aspect of the present invention, there is provided an image pickup apparatus comprising the lens barrel mentioned above.

According to the present invention, it is possible to make an image pickup apparatus more compact than conventional image pickup apparatuses in a housed state of a photographing lens barrel, while protecting an image pickup element from harmful light.

The above and other objects, features, and advantages of the invention will become more apparent from the following detailed description taken in conjunction with the accompanying drawings.

BRIEF DESCRIPTION OF THE DRAWINGS

FIG. 2 is an external perspective view of the digital camera as the image pickup apparatus according to the embodiment of the present invention, showing a state where the power source of the digital camera is turned on.

DETAILED DESCRIPTION OF THE PREFERRED EMBODIMENTS

The present invention will now be described in detail with reference to the drawings showing preferred embodiments thereof.

Figure 1:
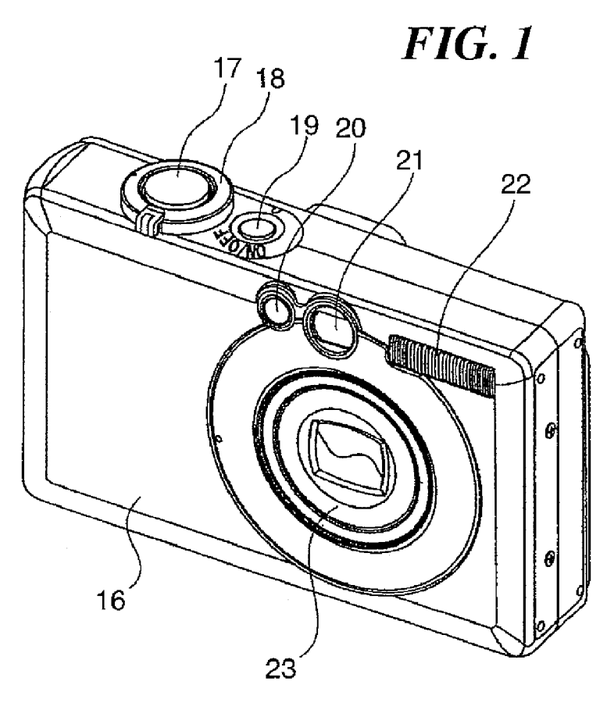
FIG. 1 is an external perspective view of a digital camera as an image pickup apparatus according to an embodiment of the present invention, showing a state where a power source of the digital camera is turned off.
Figure 2:
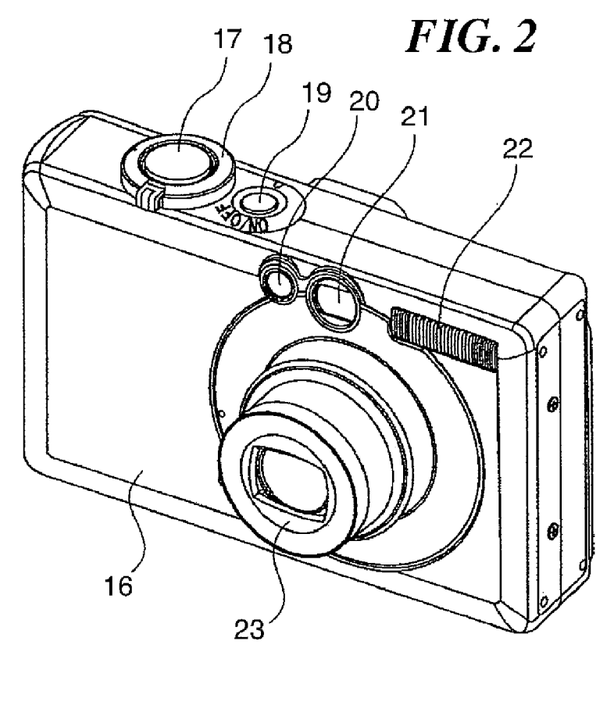
Figure 3:
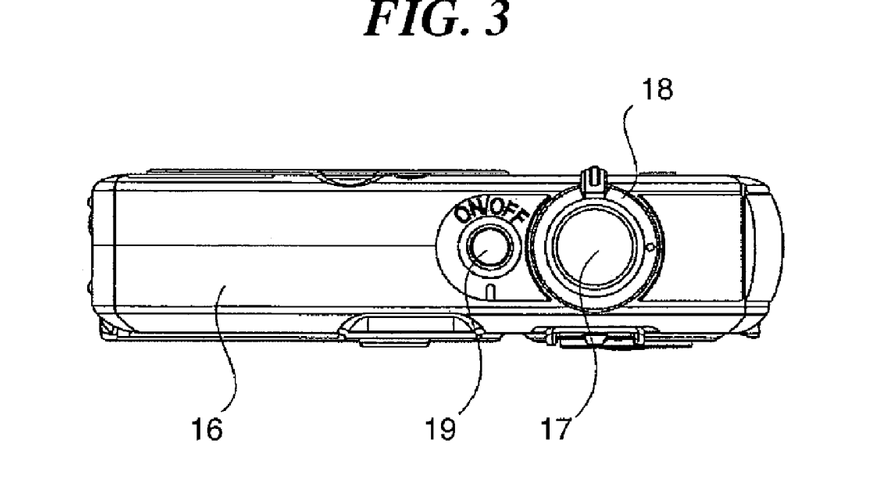
FIG. 3 is a top view of the digital camera of FIG. 1.
Figure 4:
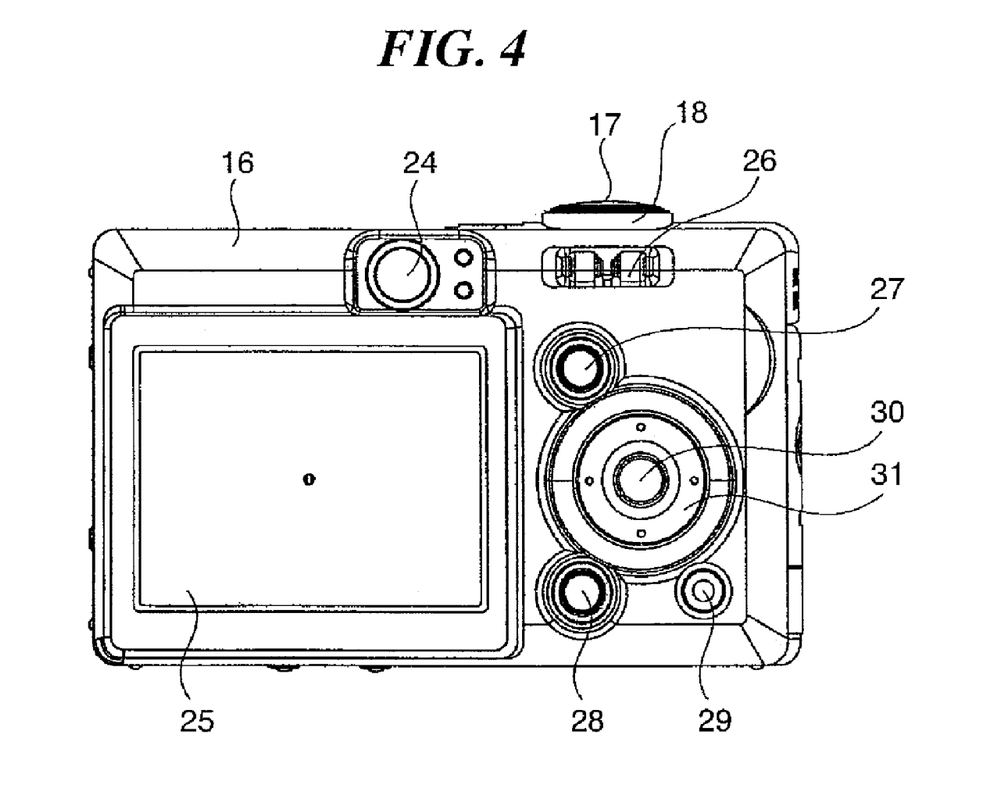
FIG. 4 is a rear view of the digital camera of FIG. 1.
Figure 5:
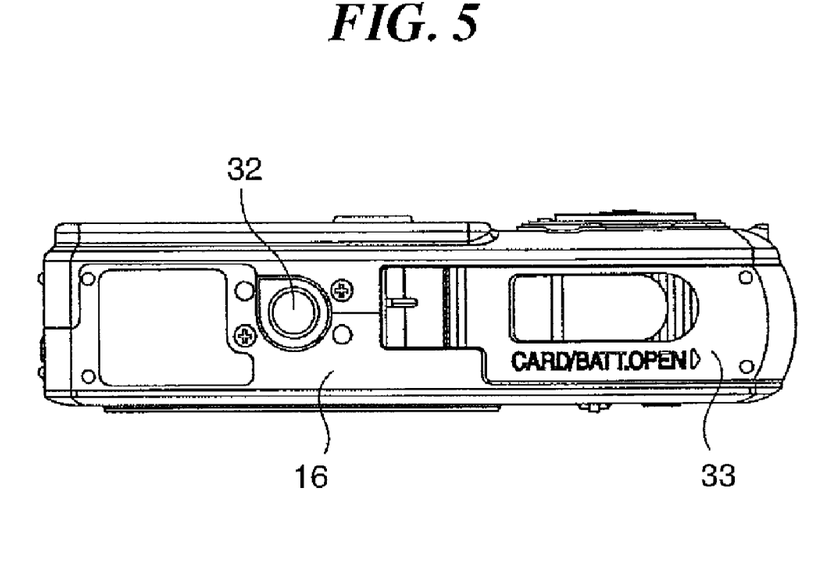
FIG. 5 is a bottom view of the digital camera of FIG. 1.

FIG. 1 and FIG. 2 are external perspective views of a digital camera as an image pickup apparatus according to an embodiment of the present invention, in which FIG. 1 shows a state where the power source of the digital camera is turned off, and FIG. 2 shows a state where the power source of the digital camera is turned on. FIG. 3 is a top view of the digital camera. FIG. 4 is a rear view of the digital camera. FIG. 5 is a bottom view of the digital camera.

A digital camera 16 according to an embodiment of the present invention has a zooming mechanism capable of changing the photographing magnification.

On the front surface of the digital camera 16, there are arranged a finder 21 which determines the composition of a subject, an auxiliary light 20 which assists a light source at the time of performing photometry and range finding, a stroboscope 22, and a photographing lens barrel 23.

On the upper surface of the digital camera 16, there are arranged a release button 17, a power source switching button 19, and a zoom switching dial 18. On the bottom surface of the digital camera 16, there are arranged a tripod attaching section 32, and a card battery cover 33 in which a memory card drive 43 and a battery insertion section (not shown) are arranged.

On the rear surface of the digital camera 16, there are arranged operation buttons 26, 27, 28, 29, 30 and 31, so that the operation of these operation buttons enables various functions to be switched variously. On the rear surface of the digital camera 16, there are also arranged a display 25 made of a LCD, and a finder eyepiece section 24.

The operation of the operation buttons 26, 27, 28, 29, 30 and 31 causes the operation modes of the digital camera, such as for example, a photographing mode, a reproduction mode, and a moving picture photographing mode to be selected.

The display 25 (image display section) displays, on its screen, image data stored in a memory 41, and the image data read from a memory card. Further, a plurality of photographed data are subjected to reduced display on the screen by the switching of display modes.

Figure 6:
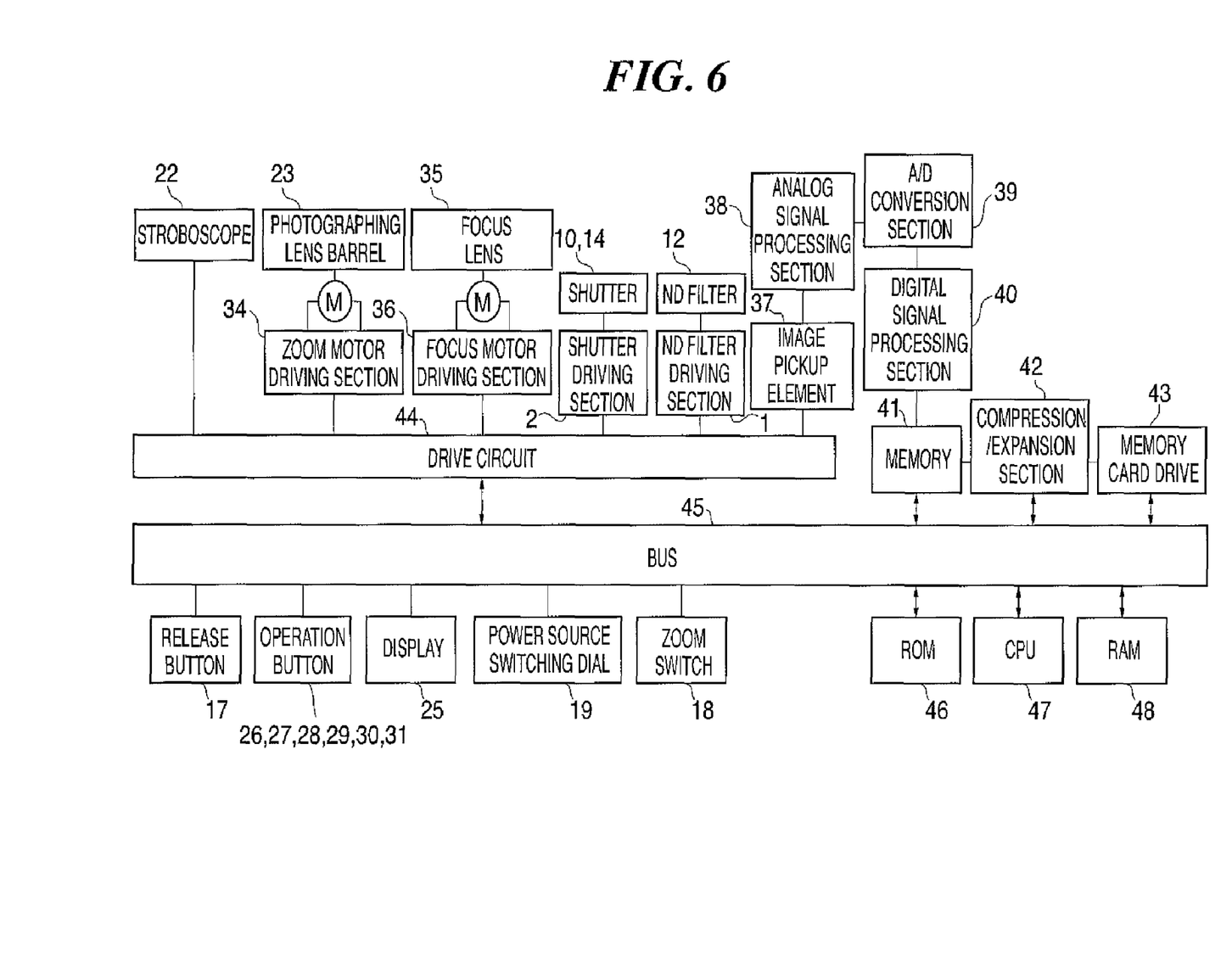
FIG. 6 is a block diagram showing a main part of an internal configuration of the digital camera of FIG. 1.

FIG. 6 is a block diagram showing a main part of the internal configuration of the digital camera 16 shown in FIG. 1.

In FIG. 6, a control section of the digital camera 16 of FIG. 1 is configured by a CPU 47, a ROM 46 and a RAM 48, and is connected to various components such as the release button 17, the operation buttons 26 to 31, the display 25, the power source switching button 19, the memory 41, and the memory card drive 43 via a bus 45.

To the control section is connected, via the bus 45, a drive circuit 44 to which a zoom motor driving section 34, a focus motor driving section 36, and a shutter driving section 2 are connected, and further, an ND filter driving section 1, an image pickup device 37 such as a CCD and a CMOS, and the stroboscope 22 are connected. This connection arrangement enables the respective components to be drivably controlled by signals from the control section.

The ROM 46 stores programs for controlling each of the above described functional components. The RAM 48 stores data necessary for the respective control programs.

In FIG. 6, when a user operates the power source switching button 19 to switch the power source from OFF to ON, the CPU 47 reads a necessary control program from the ROM 46 to start an initial operation. That is, the CPU 47 causes the photographing lens barrel 23 to be moved to a predetermined photographing possible area, to start a photographing function, thereby realizing a photographing standby state.

When the release button 17 is depressed to perform a photographing operation, the CPU 47 detects the lightness of a subject by the image pickup device 37, to determine, on the basis of the detected photometric value, a diaphragm value, a shutter speed, and whether to make the stroboscope 22 emit light. Alternatively, the user may also select beforehand to forcibly make the stroboscope 22 emit light or to prevent the stroboscope 22 from emitting light. Next, the CPU 47 performs a range finding operation to measure a distance to the subject, and causes the focus motor driving section 36 to move a focus lens 35 (focusing section) to a predetermined focus position. Next, the CPU 47 causes shutters 10 and 14 to open or be closed to capture desired image data into the image pickup device 37.

The image pickup device 37, which is made of a CCD, a CMOS or the like, accumulates electric charges according to the light quantity of light made incident on the basis of an exposure control value, and then outputs the electric charges, which are made of image data, to an analog signal processing section 38.

The analog signal processing section 38 performs analog processing to the captured image data, and outputs the processed image data to an A/D conversion section 39. The A/D conversion section 39 converts the received analog data into digital data, and outputs the digital data to a digital signal processing section 40, in which the digital data are processed. The digital data are eventually stored in the memory 41.

The image data stored in the memory 41 are subjected to compression processing, or the like, based on JPEG, TIFF, or the like, by a compression/expansion section 42 according to an operation of the operation button 38, so as to be stored in the memory card.

Further, in a case of where the digital camera has not the memory 41, the digital data processed by the digital signal processing section 40 are output to the compression/expansion section 42, so as to be stored in the memory card drive 43.

The image data stored in the memory 41 and the image data stored in the memory card drive 43 are subjected to expansion processing by the compression/expansion section 42, to thereby enable the expanded image data to be displayed on the display 25 via the bus 45. When the user views an image on the display 25 to thereby judge that the image is unnecessary, the user can eliminate the image by operating the operation button 29.

The operation of the zoom switching dial 18 causes the zoom motor driving section 34 to be controlled via the drive circuit 44 to thereby move the photographing lens barrel 23 in the optical axis direction of the lens. Further, the operation of the zoom switching dial 18 realizes the enlargement/reduction of a stored image displayed on the display 25, a so-called digital zoom.

Next, description will be made of a configuration of a diaphragm shutter unit provided in the photographing lens barrel 23 of the digital camera 16.

Figure 7:
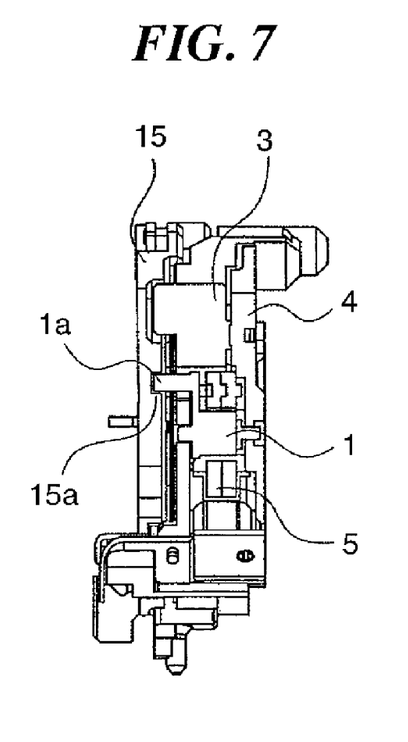
FIG. 7 is a sectional view of a diaphragm shutter unit.
Figure 8:
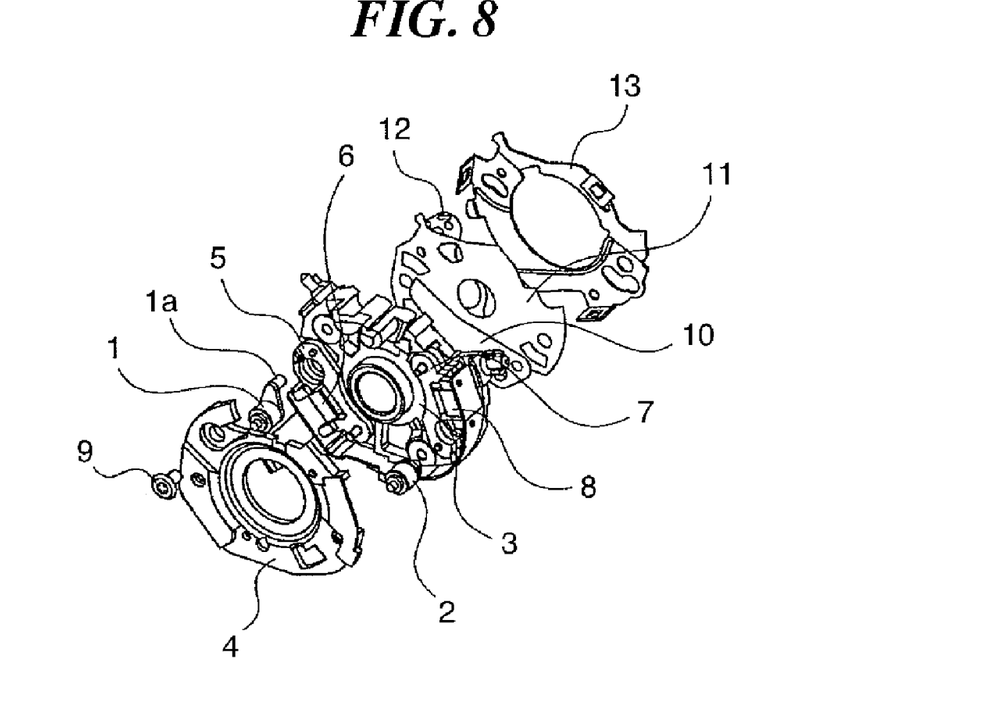
FIG. 8 is a perspective view of the diaphragm shutter unit of FIG. 7 viewed from the front of an optical axis, that is, from the subject side.
Figure 9:
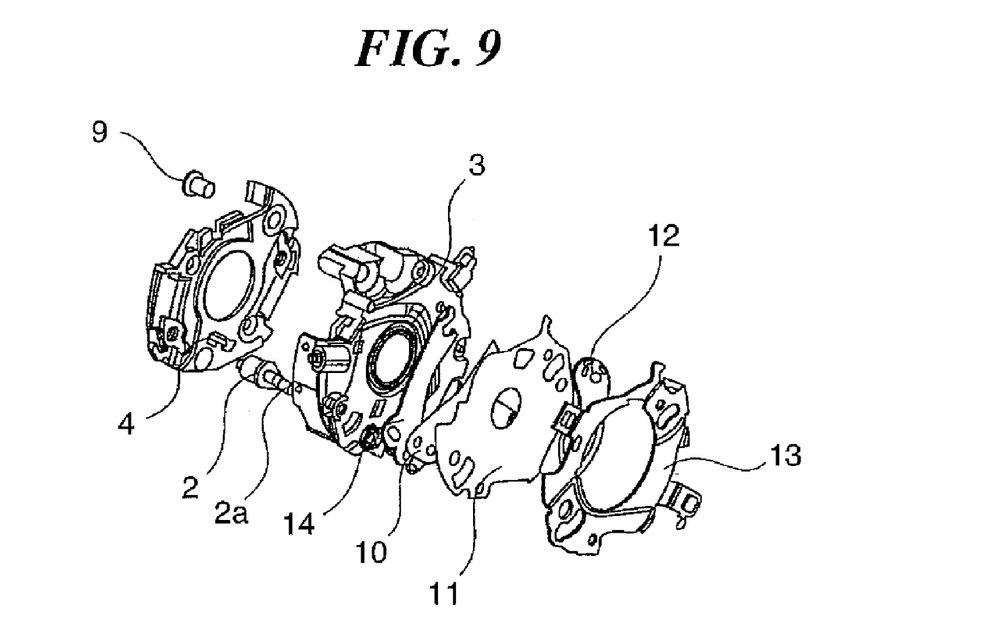
FIG. 9 is a perspective view of the diaphragm shutter unit of FIG. 7 viewed from the rear of the optical axis, that is, from the side of an image pickup device.
Figure 10:
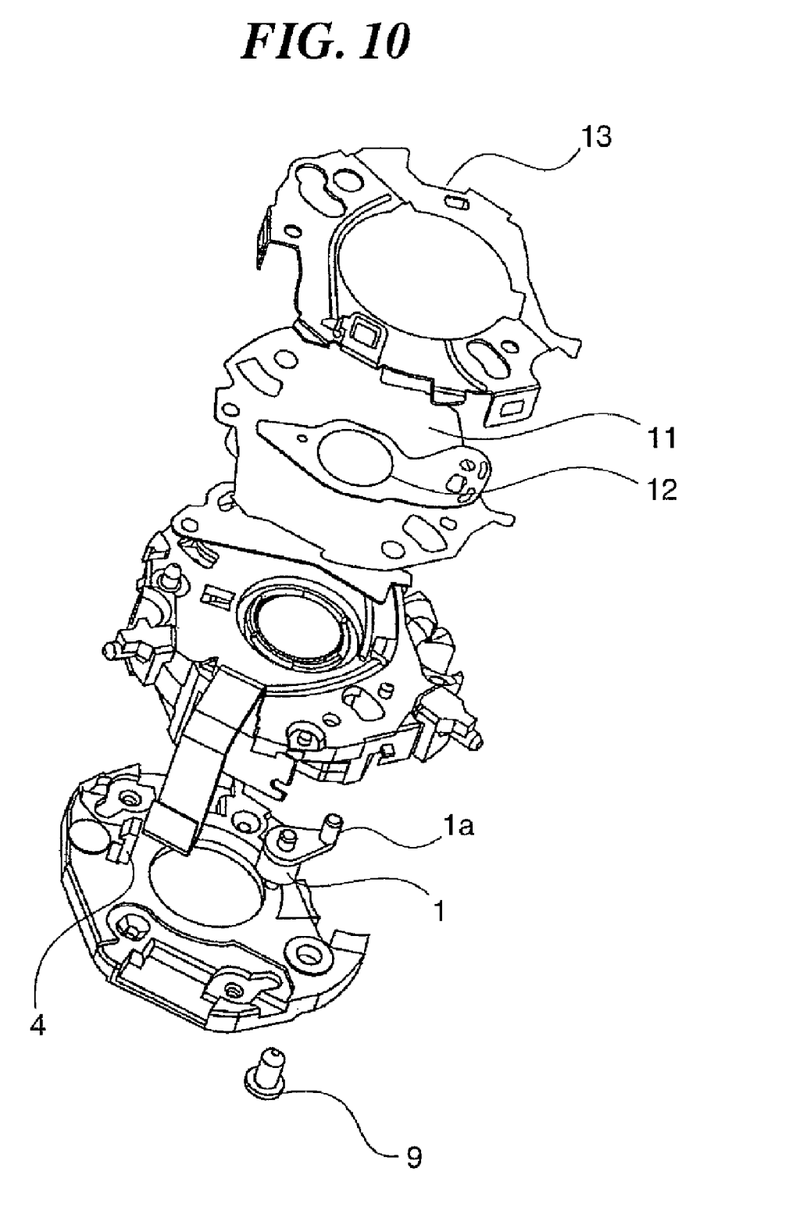
FIG. 10 is a perspective view of the diaphragm shutter unit of FIG. 9 viewed from another angle.

FIG. 7 is a sectional view of the diaphragm shutter unit. FIG. 8 is a perspective view of the diaphragm shutter unit of FIG. 7 viewed from the front of the optical axis, that is, from the subject side. FIG. 9 is a perspective view of the diaphragm shutter unit FIG. 7 viewed from the rear of the optical axis, that is, from the side of the image pickup device 37. FIG. 10 is a perspective view of the diaphragm shutter unit of FIG. 9 viewed from another angle.

Reference numeral 12 denotes an ND filter (dimming filter) having a dimming function capable of reducing light from an object. In the case of a very high-luminance subject, the ND filter 12 is inserted in such a position as that the light beam is shielded, so as to suppress the amount of light incident on the image pickup device 37.

Reference numerals 10 and 14 denote the shutters having a light shielding function capable of shielding the light from the object. The shutters 10 and 14 are provided in an openable and closable manner, and adjust the amount of light incident on the image pickup device 37 to an appropriate photometric value. Further, a shutter yoke 7 and a shutter coil 8 are attached to a diaphragm shutter base plate 3 on which the shutters 10 and 14 are operated. Thereby, the shutter driving section 2 is incorporated into a location from which the shutter yoke 7 retreats to open. Similarly, a diaphragm yoke 5 and a diaphragm coil 6 are attached to the diaphragm shutter base plate 3, and the diaphragm driving section 1 is incorporated into a location from which the diaphragm yoke 5 retreats to open. The openings are covered with a diaphragm shutter holding member 4, so as to hold these members, and the diaphragm shutter holding member 4 is fixed by a screw 9. Shutter blades are fitted to these members on the opposite side thereof (the image pickup device side on the optical axis). A shutter lever 2a provided in the shutter driving section 2 penetrates a groove provided in the diaphragm shutter base plate 3, so as to project from the back surface of the diaphragm shutter base plate 3. The shutters 10 and 14 are incorporated into the shutter lever 2a. An aperture plate 11, having a hole used for determining a reference aperture of the photographing optical system, is disposed on the shutters 10 and 14 on the backside surface side thereof. The ND filter 12 is incorporated into an ND filter lever 1a disposed in the ND filter driving section 1 from the back surface of the aperture plate 11. A diaphragm shutter holding section 13 is incorporated from the back surface of the aperture plate 11 and the ND filter 12.

A magnet is integrally formed in each of the shutter driving section 2 and the ND filter driving section 1. Electrifying the shutter coil 8 or the diaphragm coil 6 causes the shutter driving section 2 or the ND filter driving section 1 to be driven, to thereby open or close the shutters 10 and 14 disposed at the tip of the lever of the shutter driving section 2 or the ND filter driving section 1, or to thereby insert/retreat the ND filter 12 to/from the optical axis.

Figure 11:
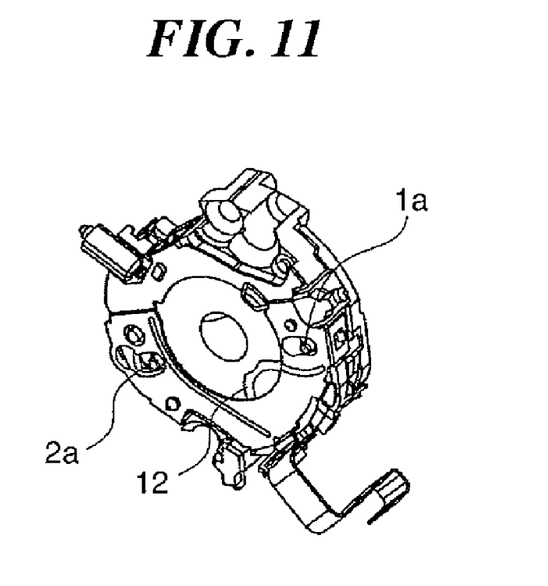
FIG. 11 is a perspective view of the diaphragm shutter unit of FIG. 7 viewed from the side of the image pickup device.
Figure 12A:
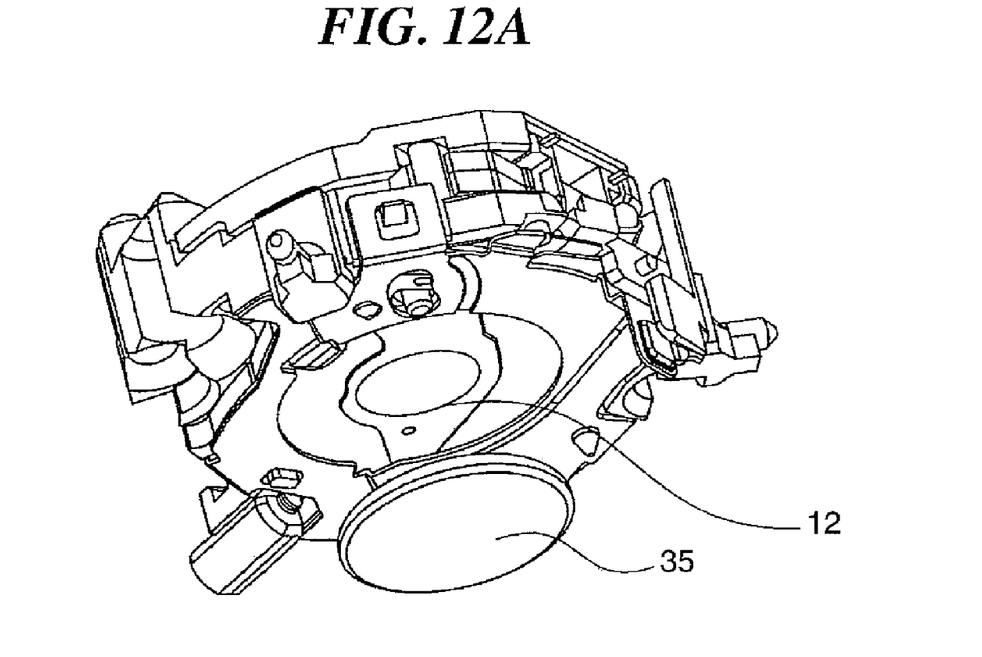
FIGS. 12A and 12B are views useful in explaining a relationship among a focus lens, an ND filter and a shutter in a photographing state of the diaphragm shutter unit of FIG. 11.
Figure 12B:
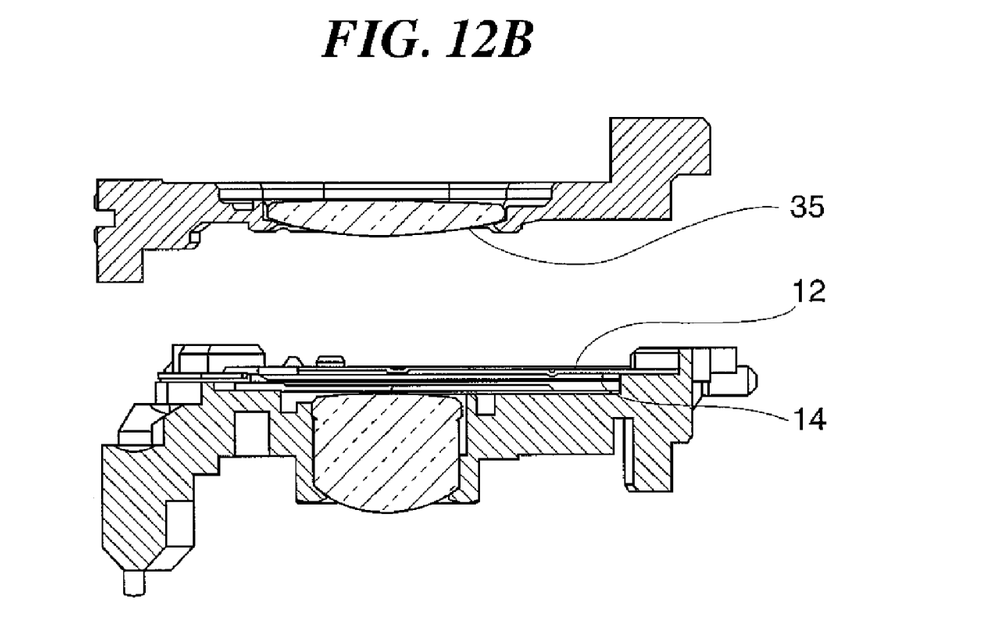
Figure 13A:
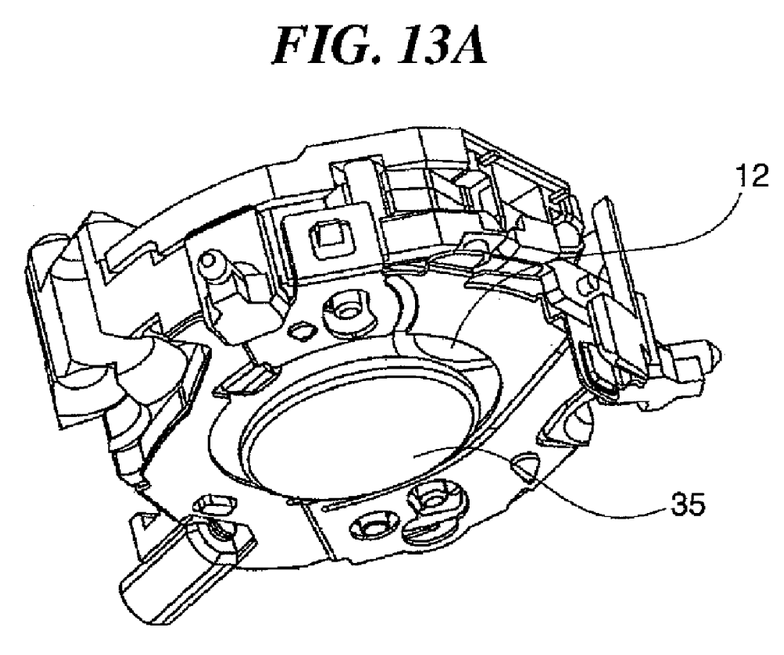
FIGS. 13A and 13B are views useful in explaining a relationship among the focus lens 35, the ND filter 12 and the shutter 14 in a housed state of the diaphragm shutter unit of FIG. 11.
Figure 13B:
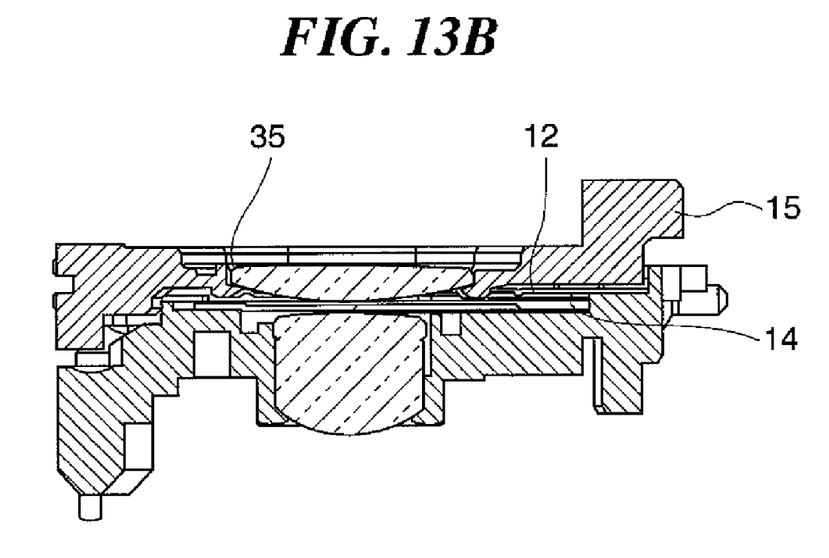

FIG. 11 is a perspective view of the diaphragm shutter unit of FIG. 7 viewed from the side of the image pickup device. Further, FIG. 12A and FIG. 12B are views useful in explaining a relationship among the focus lens 35, the ND filter 12 and the shutter 14 in a photographing state of the diaphragm shutter unit of FIG. 11. On the other hand, FIG. 13A and FIG. 13B are views useful in explaining a relationship among the focus lens 35, the ND filter 12 and the shutter 14 in the housed state of the diaphragm shutter unit of FIG. 11. In FIGS. 12A and 12B, and FIGS. 13A and 13B, the shutter 10 is not shown because the operation of the shutter 10 is the same as that of shutter 14.

Figure 14:
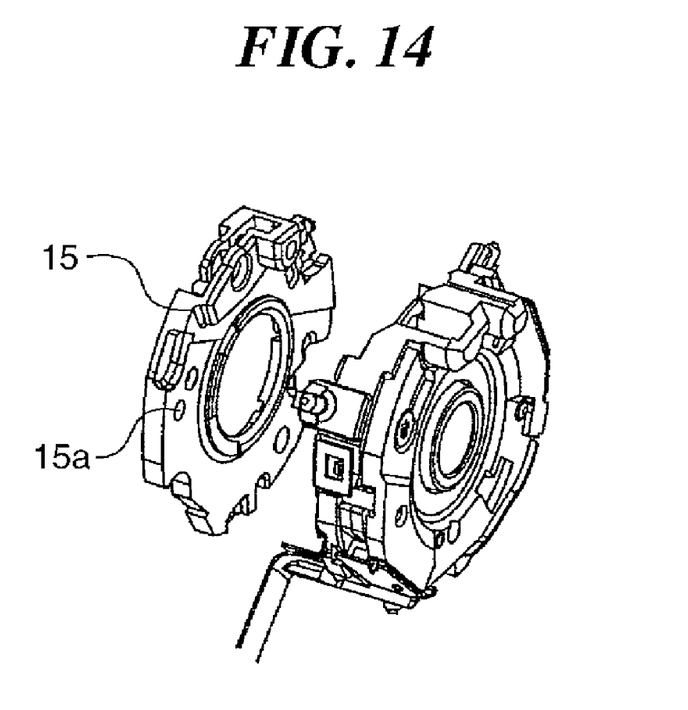
FIG. 14 is an exploded perspective view of the diaphragm shutter unit of FIG. 11.

Notches are formed in the diaphragm shutter holding section 13 along the driving locus of the shutter lever 2a and the ND filter lever 1a. A lens holding section 15 for holding the focus lens 35, which is operable regardless of the movement of the diaphragm shutter unit on the optical axis, is disposed behind arranged at the rear of the optical axis of the diaphragm shutter unit. When the photographing lens barrel 23 is in the photographing possible state, the lens holding section 15 is located so as to be separated to some extent from the diaphragm shutter unit, as shown in FIG. 14 or FIGS. 12A and 12B. On the other hand, when the photographing lens barrel 23 is in the housed state, that is, when the power source of the digital camera 16 is turned off, the diaphragm shutter unit and the lens holding section 15 are held adjacent to each other, as shown in FIG. 7 or FIGS. 13A and 13B.

At this time, the photographing lens barrel 23 is operated as follows. First, after the shutters 10 and 14 are set to be closed and the ND filter 12 is set to be open, the lens barrel is set in the housed state (FIG. 7, FIGS. 13A and 13B). Retreating of the ND filter 12 causes a space to be formed, which enables a part of the lens holding section 15 to access the space formed by retreating of the ND filter 12, followed by terminating the operation of the photographing lens barrel 23. Note that instead of the lens holding section 15, the focus lens 35 may also be made to access the space formed by retreating of the ND filter 12. Even when the ND filter is retreated in order to reduce the size of the lens barrel in the housed state which is a non-image-pickup state, the shutters 10 and 14 are closed, which suppresses the harmful light incident on the image pickup device 37.

Here, as shown in FIG. 7, the shutter lever 1a and the ND filter lever 2a engageably enter a hole-shaped shutter regulating section 15b (not shown) and a hole-shaped ND filter regulating section 15a disposed in the lens holding section 15, respectively, which causes the operation of the shutter lever 1a and the ND filter lever 2a to be regulated.

In addition to the above, a projection of the other member causes the ND filter 12 to be forcibly moved to the retreat position and held in the retreat state so as not to be moved therefrom. In this case, the projection is not directly abutted to the ND filter 12, and hence it is possible to avoid the possibility of deforming the thin and fragile ND filter 12.

As described above, the present embodiment is provided with a simple regulation mechanism which, at the non-image-pickup time, makes the photographing lens barrel 23 in the housed state and holding the ND filter and the diaphragm in the retreated state so as not to be moved.

Figure 15:
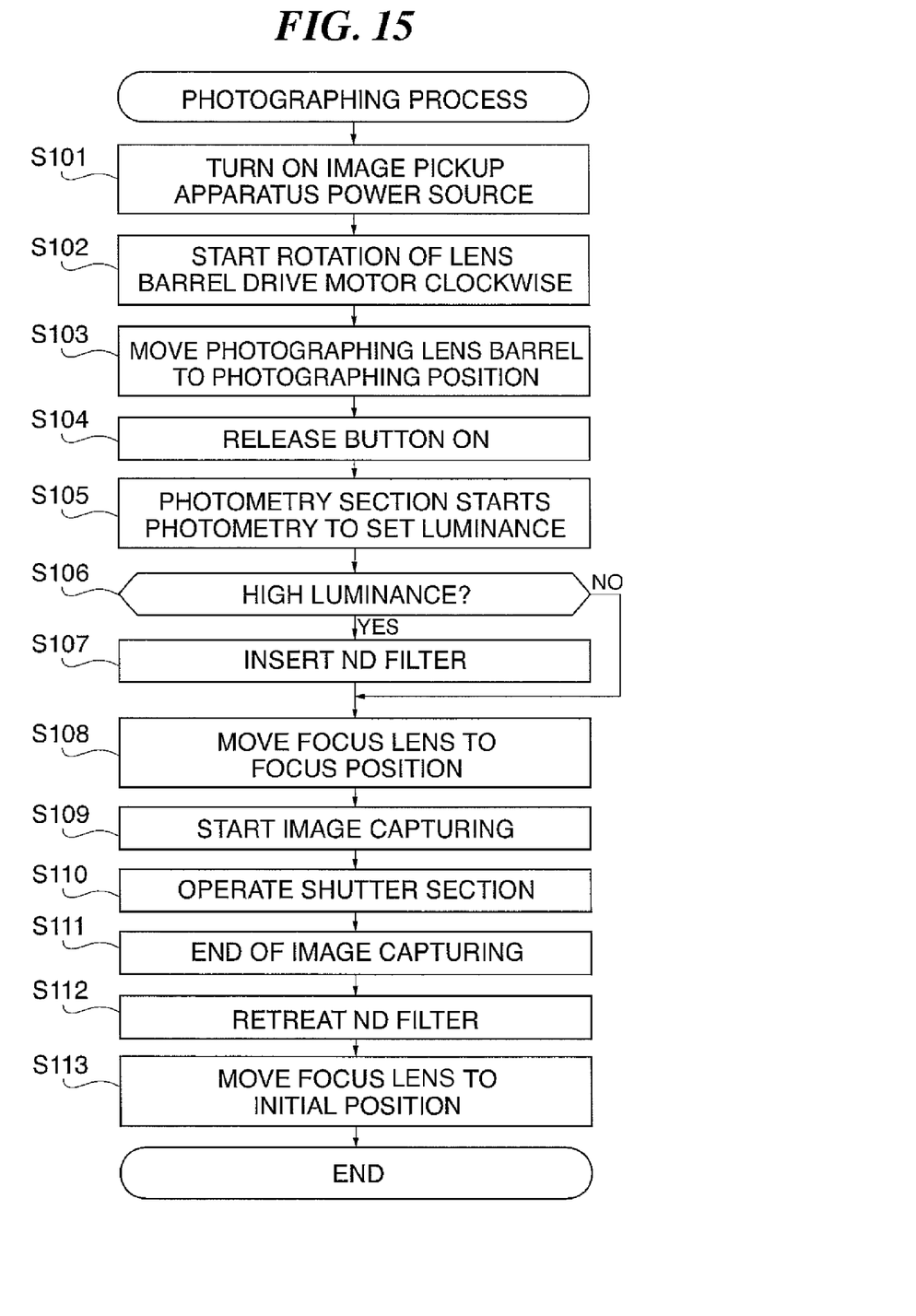
FIG. 15 is a flowchart showing the procedure of a photographing process carried out by the digital camera of FIG. 1 is turned on to the end of photographing.

FIG. 15 is a flowchart showing the procedure of a photographing process carried out by the power source of the digital camera in FIG. 1.

In FIG. 15, when the user turns on the power source of the image pickup apparatus, the CPU 47 transmits an instruction to the zoom motor driving section 34 to start rotation of the lens barrel drive motor clockwise (step S102). Then, the CPU 47 performs predetermined operations to stop the rotation of the lens barrel drive motor when confirming that the photographing lens barrel 23 is moved to reach a photographing position at which a photographing possible state is realized (step S103). At this time, the photographing lens barrel 23 is changed from the state shown in FIG. 1 to the state shown in FIG. 2. This causes the photographing lens barrel 23 to be made in the above described state shown in FIG. 12.

Next, when the user turns on the release button 17 (step S104), the photometry is performed to obtain the luminance information of the subject (step S105). When the luminance of the obtained luminance information is higher than a predetermined luminance (step S106), the ND filter 12 is inserted in the optical axis, to change the incident light amount (step S107). When the luminance of the obtained luminance information is lower than the predetermined luminance, the ND filter 12 is held in the retreat state without being moved.

Thereafter, the focus lens 35 is operated and moved to a focusing position of the subject (step S108), followed by starting to capture the image data (step S109). Next, the shutters 10 and 14 are moved from the open position to the closed position, so as to shield the incident light, followed by terminating the image data capturing operation (step S110). Thereafter, the ND filter 12 is retreated (step S112) and the focus lens is moved to its initial position (step S113), and hence the shutters 10 and 14 are moved from the closed position to the open position.

Figure 16:
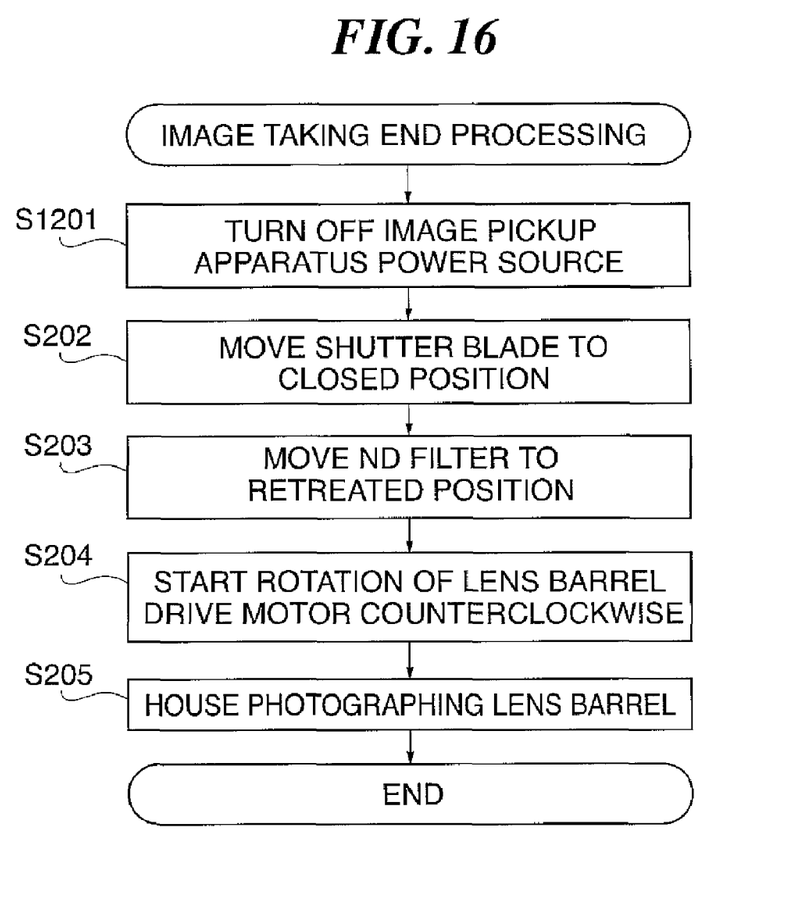
FIG. 16 is a flowchart showing the procedure of a photographing end process for turning off the power source of the digital camera of FIG. 1.

FIG. 16 is a flowchart showing the procedure of a photographing end processing procedure for turning off the power source of the digital camera of FIG. 1.

When the user turns off the power source of the photographing apparatus (step S201), the shutters 10 and 14 are first moved to the closed position (step S202), and the ND filter 12 is moved to the retreated position, so as to form a space (step S203) The lens barrel drive motor is started to be rotated counterclockwise so that the lens holding section 15 or the focus lens 35 is located in the space formed as above (step S204), and then the photographing lens barrel as the whole is housed in a predetermined position (step S205), followed by terminating the operation. This causes the photographing lens barrel 23 to be made in the above described state as shown in FIG. 13.

With the above described configuration, it is possible to prevent, by a simple method, the shutters 10, 14 and the ND filter 12 from being unnecessarily operated. Further, the image pickup apparatus can be made more compact than the conventional image pickup apparatus when the photographing lens barrel is made in the housed state, while preventing the image pickup element 37 from receiving harmful light.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2007-040907 filed Feb. 21, 2007, which is hereby incorporated by reference herein in its entirety.

What is claimed is:

1. A lens barrel comprising:
   a lens holding section holding a focusing lens;
   a shutter adapted to be opened and closed to shield the light;
   a dimming filter adapted to be insertable into an optical light path to reduce light passing through the focusing lens, wherein the dimming filter is positioned between the shutter and the focusing lens when the dimming filter is inserted into the optical light path; and
   a control unit adapted to control movements of the lens holding section, the dimming filter, and the shutter,
   wherein said control unit is adapted, in a non-image-pickup state, to close the shutter and to retreat the dimming filter to a retreated position, which is out of the optical light path, and to move the focusing lens or the lens holding section to a space previously occupied by the dimming filter previously inserted into the optical light path.

2. The lens barrel as claimed in claim 1, further comprising a regulation unit adapted to maintain the dimming filter in the retreated state when the dimming filter is retreated.

3. An image pickup apparatus comprising:
   an image pickup device; and
   a lens barrel comprising:
   a lens holding section holding a focusing lens;
   a shutter adapted to be opened and closed to shield the light;
   a dimming filter adapted to be insertable into an optical light path to reduce light passing through the focusing lens, wherein the dimming filter is positioned between the shutter and the focusing lens when the dimming filter is inserted into the optical light path; and
   a control unit adapted to control movements of the lens holding section, the dimming filter, and the shutter,
   wherein said control unit is adapted, in a non-image-pickup state, to close the shutter and to retreat the dimming filter to a retreated position, which is out of the optical light path, and to move the focusing lens to a space previously occupied by the dimming filter previously inserted into the optical light path.

4. The lens barrel as claimed in claim 1, wherein:
   the dimming filter is positioned in front of the focusing lens in relation to the optical path, and
   the shutter is positioned in front of the dimming filter in relation to the optical path.

5. The image pickup apparatus as claimed in claim 3, wherein:
   the focusing lens is positioned in front of the image pickup device in relation to an optical path,
   the dimming filter is positioned in front of the focusing lens in relation to the optical path, and
   the shutter is positioned in front of the dimming filter in relation to the optical path.

* * * * *